United States Patent [19]

Pasterkamp

[11] Patent Number: 4,609,059
[45] Date of Patent: Sep. 2, 1986

[54] WEIGHING DEVICE WITH LOAD SENSING OF TRAVELING BALANCES

[75] Inventor: Klaas Pasterkamp, Huizen, Netherlands

[73] Assignee: Administratie - en Automatisergscentrum Vulcaan B.V., Netherlands

[21] Appl. No.: 788,082

[22] Filed: Oct. 17, 1985

Related U.S. Application Data

[63] Continuation of Ser. No. 543,937, Oct. 20, 1983.

[30] Foreign Application Priority Data

Nov. 2, 1982 [NL] Netherlands ............... 8204250
Oct. 6, 1983 [NL] Netherlands ............... 8303429

[51] Int. Cl.$^4$ ............... G01G 19/52; G01G 3/14; A01K 43/08; B07C 5/28
[52] U.S. Cl. ............... 177/50; 177/210 EM; 177/DIG. 6; 209/514; 209/593
[58] Field of Search ............ 177/210 EM, DIG. 6, 177/50, 25; 209/512–514, 516, 593, 595; 200/84 C; 356/373, 375

[56] References Cited

U.S. PATENT DOCUMENTS

| | | |
|---|---|---|
| 2,273,591 | 2/1942 | Powell . |
| 3,966,049 | 6/1976 | Van Den Berg ......... 177/DIG. 6 X |
| 4,106,628 | 8/1978 | Warkentin et al. ............. 209/593 X |
| 4,107,591 | 8/1978 | Herr et al. ........................ 361/148 X |
| 4,258,812 | 3/1981 | Pfeiffer ...................... 177/DIG. 6 X |
| 4,281,342 | 7/1981 | Ueda et al. ...................... 356/373 X |
| 4,305,097 | 12/1981 | Doemens et al. ............... 356/375 X |
| 4,319,189 | 3/1982 | Cullum, Jr. et al. ................ 324/208 |
| 4,383,613 | 5/1983 | Van Kettenbroek ............... 209/514 |
| 4,384,184 | 5/1983 | Alvarez ............................. 200/84 C |

FOREIGN PATENT DOCUMENTS 1396932 12/1965 France .
1225904 3/1971 United Kingdom .

OTHER PUBLICATIONS

"Electronikpraxis", Vogel-Verlag, Würzburg, vol. 16, No. 3, Mar. 1981.
"Wiegand's Wonderful Wires", Popular Science, May 1979, pp. 102–104 and 165.

Primary Examiner—George H. Miller, Jr.
Attorney, Agent, or Firm—Larson and Taylor

[57] ABSTRACT

A weighing device having an endless track to which balances are connected, the track having a region for loading the balances with objects, and a region for letting the movement of the balances during weighing of the objects dampen out so that the balances reach an end position. A position detector disposed at a fixed location along the track detects the end position of the balance and provides an indication of the end position in digital form so that the weight of the objects can be determined therefrom. The detector can take a number of forms including the combination of an optical contrast and a camera and, in addition, can, for example, utilize reed switches, Hall generators, Wiegand effect detectors or magnetostrictive detectors in measuring the end positions of the balances.

6 Claims, 4 Drawing Figures

WEIGHING DEVICE WITH LOAD SENSING OF TRAVELING BALANCES

This application is a continuation, of application Ser. No. 543,937 filed Oct. 20, 1983 now abandoned.

The invention relates to a weighing device provided with a plurality of moving balances each of which is adapted to take a position that is dependent on its weight load, having a region in which objects to be weighed are fed to the balances and a second region in which the balances come at rest in their final position.

Such weighing devices for fast and accurately weighing objects are known from among other U.S. Pat. Nos. 3,432,034; 3,528,572 and 3,370,691. Though all these publications relate to weighing of eggs the invention is also suitable for weighing other objects such as fowls or fruits. Further an object in the sense of the invention may consist of a plurality of items.

With weighing devices of the depicted type a relatively high accuracy of weight value is attained, but this accurary is only used for allotting the objects to certain weight classes. This means for instance that when afterward one wants to know the total weight of the objects allotted to a certain class or the average weight of objects in that class, these data may; have gone astray.

In the latter instance in practice a great need exists to provide data with the highest possible accuracy such as the immediate availability of data with respect to not only the number of objects in a certain class, but also for instance their average weight.

These aims are already in principle attained with devices of the type in which the objects are electronically weighed and the weighing results are used for grading the objects in certain classes. These known devices of which several are commercially available have, however, the disadvantage that the weighing accuracy is relatively low. Electronic weighing apparatus per se are, it is true, capable of providing sufficient weighing accuracy, but in practice it is necessary to provide such a high throughput that insufficient weighing time is available to attain a high accuracy. With certain commercially available machines for instance it is useful to gauge or regauge the weighing devices in dependence on the working speed of the machine by weighing objects of standard weight and adapting the weighing results to the empirical dependence of the weighing results from the working speed of the machine.

Theoretical grounds for the difficulties preventing a sufficient weighing accuracy are the necessity to have the object completely at rest, at least in the vertical direction, when it is weighed, and the problem of vibration disturbances, which affect weighing devices with a high response speed rather strongly and which can only with great difficulty be damped out.

The invention aims to provide a weighing device of the type mentioned in the opening paragraph of this specification, which provides highly accurate weighing data.

A further aim of the invention is to provide a device having the advantages of the said commercially available machines, but combining a high working speed with a high weighing accuracy that is not dependent on the working speed of the machine.

Still a further aim of the invention is to provide a weighing device in a grading machine which in case of failure of electronical components or devices (which failure often only can be cured by replacement of at least part of these components) still is able to provide reliable grading results.

According to the invention the above indicated aims are attained in that a detector is present which indicates the final position of the balances in digital form.

It is noted that from the British Patent Specification No. 1,225,904 a device is known for ascertaining the position of a balance in digital form. This system is based on a number of steps a step motor has to carry out to let a member take a position corresponding to that of the balance. This system, however, cannot be used for a moving balance without considerable complications.

The French Patent Specification No. 1,396,932 shows a device in which reading of a weight value and comparing it with a predetermined weight value is made easier by use of a code disc. This system too is not suitable for balances moving in a row.

Finally the U.S. Pat. No. 2,273,591 shows an egg sorting device in which a semi-transparant disc having a graduation is used for reading a weight value.

Because the detector indicates normally the position of the balance as a geometrical quantity and this needs not to be directly proportional to the weight load of the balance, it is according to a further elaboration of the invention provided that a calculator is present deriving from the digital indication of the balance position the weight load of the balance in digital form. Such a calculator may contain data relating to a number of positions of the balances and the weight value corresponding therewith or calculating instructions based on the relation between the balance positions and the weight loads of the balances. A small computer or a microprocessor in many instances is sufficient for this job. The weighing device according the invention may be part of a machine provided with a plurality of output stations each for delivering the objects having a weight within a predetermined weight class. In that instance at the transition between two weight classes it may happen, that the ascertained weight is just in one class, whereas by reason of a small deviation such as a small oscillatory movement, the object is allotted to the adjacent weight class, for instance if the allotting to any weight class is carried out mechanically or magnetically as is the case with the devices known from the cited U.S. Pat. No. 3,432,034, 3,528,572 or 3,370,691. In that instance complete agreement between the measured weight and the class to which an object is sent, is secured by providing that a positioning device is present to bring the balances in a position in which they discharge in an output station having the weight class encompassing the weight detected by said detector.

In case the device is provided with a plurality of guides cooperating with the balances to conduct them to the output stations, as is the case with the device according to the above mentioned United States Patent Specifications, this positioning device may consist of electromagnets at the entrance side of the guides cooperating with a magnetically sensitive part of the balances.

According to an embodiment of the invention a movable part of the balances may be provided with an optical contrast and the detector with light sensitive means. In this case the detector may be a so called c c d (coupled charge device) camera which is commercially available.

According to further embodiments the balances may be provided with a magnetic part and the detector with Reed-contacts, Hall generators or magnetic feelers based on the Wiegand effect.

A preferred embodiment which combines a high accuracy and reliability with reasonable costs consists in that the balances are provided with a magnetic part and that the detector contains a magnetic distance measuring system of the magnetostriction type provided with means for generating a mechanical pulse at a location dependent on the location of said magnetic part, a receiver for receiving said pulse and a means for deriving a signal dependent on the time the mechanical pulse needs to travel from the location where it was generated to the said receiver.

Such magnetostrictive systems are commercially available and rely on the phenomenon that in a conductor system through which a strong current pulse is sent a magnetic field is induced which at the location of the field of the magnetic part may induce a mechanical deformation in a magnetostrictive material, which can be propagated, so that measuring the propagation time gives an indication of the location of the magnetic part.

Weighing devices provided with a plurality of output stations which are each provided with control means to discharge weighed objects, weighing means for measuring the weight of the objects and allotting an output station to the objects and retardation means introducing a retardation of the output of the weighing means equal to the travelling time of an object from the weighing means to the control means of the allotted output station are known per se.

According to the invention such devices are improved with respect to weighing accuracy at high working speeds by providing that in a device according the invention provided with output stations each provided with control means to discharge weighed objects, means are present to derive from the obtained weight indication the weight class of the objects in the balances, a means for generating a signal for activating at least one of said control means and a retardation means for retarding said signal during a time period equalling the time the weighed objects needs from the detector to reach the related station.

The invention in the following is explained with reference to the drawing, in which.

Figure 1:
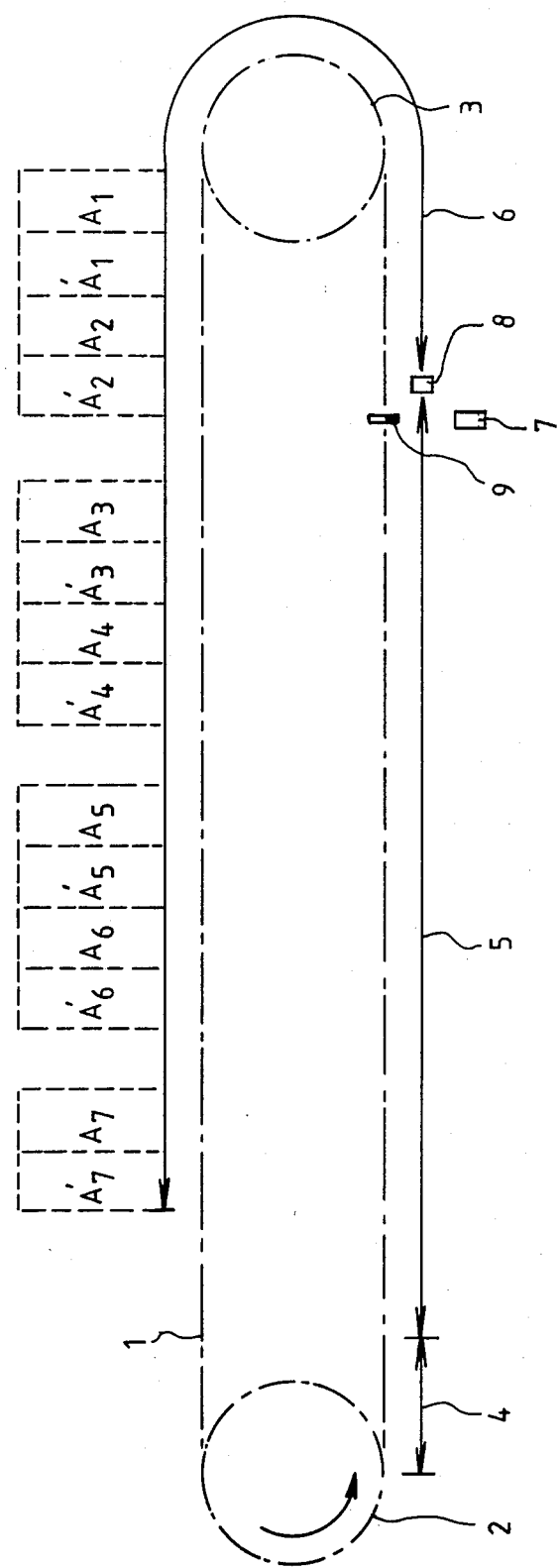
FIG. 1 shows schematically a plane view of an egg sorting machine provided with the invention.

In FIG. 1 reference 1 indicates an endless chain, to which a plurality of balances (not further shown) are mounted one behind the other. This chain runs on two horizontal guide wheels 2 and 3. In a first region, schematically indicated at 4, objects, in this case eggs, are put in the balances. In the region 5 the balances may damp out, which by using magnet means and Faucoult currents can happen in a relatively short time. The balances have a deflection of 20 cm over a weight region of 40 grams, so that in principle a very accurate weighing is obtained, provided the weighing result is properly detected.

With such a device use is made of a plurality of guides 6 the one mounted above the other and having such shapes that they guide the balances to one of the output stations $A_1$, $A'_1$, $A_2$ and so on for discharging the objects they contain.

According to an embodiment of the invention a coupled charge device (c c d) camera 7 is provided, which per se may be of known construction. Because the balances are provided with a contrast (in FIG. 1 schematically shown at 9) this camera can accurately detect and indicate the angular position of the weighing beam of a balance, which is called the balance position. For this purpose synchronization is necessary between the moment at which the camera detects and the moment at which a contrast of a balance is opposite the camera, which can be done with any known suitable means.

The camera 7 immediately gives a digital output indicating the position of the balance it views. Commercially available cameras have an output frequency of 35000 Hz, which means an output in each 30 $\mu$ sec, so that the capacity is more than a thousand times that which is normally necessary in for instance egg grading machines. The digital camera output can be fed to a computer, which can transfer it in weight values and allot these values in weight classes for calculating the number and the total weight of the objects in each class.

Figure 2:
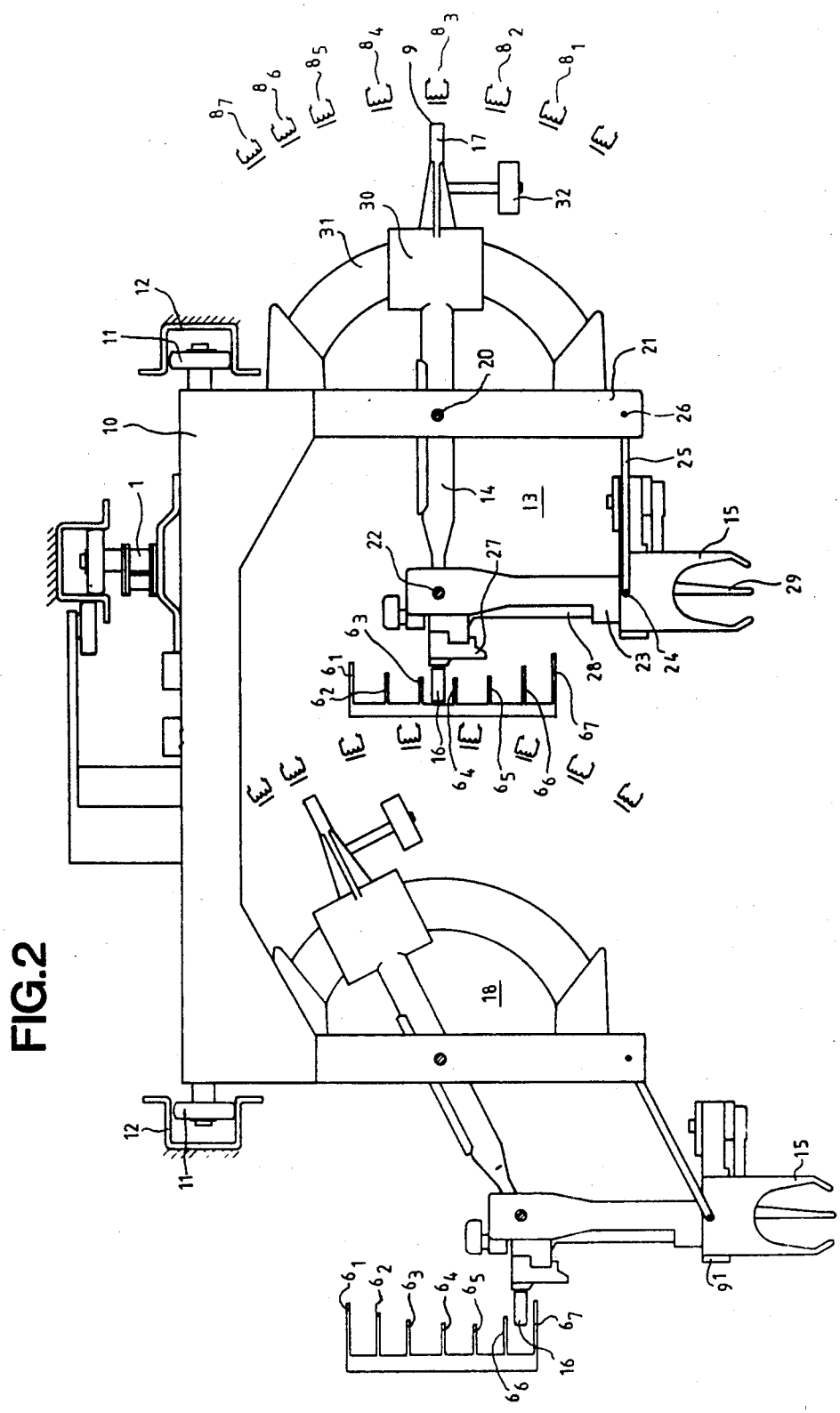
FIG. 2 shows schematically a cross-section through a bridge with two balances.

The device shown in FIG. 2 corresponds mechanically to that of the U.S. Pat. No. 4,383,613, so that in the following only a short explanation is given.

The chain 1, corresponding to chain 1 of FIG. 1, is connected at constant intervals to a number of bridge members 10, which are supported by rollers 11 in fixedly mounted guides 12. At the ends of each bridge member a balance 13 and 18 respectively is mounted. Each balance is provided with a weighing beam 14, an egg gripper 15 and a servo roller 16. Because these balances are completely known, for instance from the U.S. Pat. No. 3,432,034 in the following only a short description is given, it being clear, that this construction is not part of the invention nor is the invention limited to it.

Each weighing beam 14 can freely pivot about a shaft 20 mounted in a support member 21 depending from bridge member 10. By means of a shaft 22 the beam 14 supports a gripper mount 23, which at its lower side by means of pivot 24, links 25 and pivot 26 is connected to member 21, the points 20, 22, 24 and 26 being the corners of a parallellogram.

Further the balance is provided with a discharge pawl 27 which causes discharge of gripper 15 when it hits a discharge member (not shown). When discharge occurs the shaft of follow roller 16 is rotated about the vertical axis of a non shown shaft mounted in a vertical part 28 of the gripper mount, which shaft at its lower side is connected to a movable finger 29 of gripper 15.

Weighing beam 14 supports a damping magnet 30 cooperating with a copper sheet 31 for damping oscillations of the balance by means of Faucoult currents, and an adjustable weight 32.

In this embodiment of the invention the beam 14 is further provided with a magnet or magnetisable part 17, which in case of balances 13 also bears an optical contrast 9, whereas this optical contrast in case of balances 18 is mounted to the gripper 15 and indicated with 9'.

The guides 6, which are only schematically indicated in FIG. 1 are shown in more detail in FIG. 2, in which is visible that they consist each of seven guides $6_1$, $6_2$, . . . $6_7$ mounted above each other.

Further electromagnets $8_7$, $8_6$, . . . $8_1$ are mounted such that the magnet or magnetisable part is opposite to the electromagnet $8_n$ if follow roller 16 is located just somewhat below guide $6_n$, in which n=1, 2, ... 7.

The operation of the depicted device is the following:

After having received an egg in region 4 the balances 13 and 18 will damp out in the region 5. At the end of this region they pass cameras 7, which are enabled at the moment a contrast 9 or 9' is opposite the related camera, which then gives a digital output corresponding to the height position of the contrast 9 or 9'. From this output, when necessary via a calculator table or formula, the weight value of an egg in a balance is determined.

From these values the total weight, the number and the average weight of the eggs in each class can be determined.

With the shown embodiment a difficulty may occur that a detected value may be very near to the transition between two adjacent weight classes and that due to inaccuracies or rest oscillations of the balances the follow roller 16 mechanically comes in the weight class adjacent the weight class containing the calculated weight value. This could result in discrepancies between the number of eggs really discharged in a weight class and the number indicated by the calculator.

Such discrepancies are avoided by the electromagnets $8_1 \ldots 8_7$, which are located just before the beginning of the guides $6_1 \ldots 6_7$ and are energized, such that the position of the follow roller 16 is clearly below the guide 6 corresponding to the energized electromagnet 8, thus avoiding the indicated possibility of discrepancies. Because part 17 is always near the related electromagnet 8 and only a small displacement is necessary a high reliability can be combined with relatively small magnets.

Below the electromagnet $8_1$ still another has been shown, which corresponds to a position of roller 16 above guide $6_1$. This position normally corresponds to an empty gripper and therefor implies so big a difference with a small egg that this magnet may be superfluous.

An important advantage of the shown embodiment is that the machine in case of failure of the invention still can be used, albeit without the results of the invention.

Another advantage is, that minor adjustments of the weight classes can be carried out by using the electromagnets for that purpose.

Still another advantage is, that it can be applied to many existing machines almost without further alterations.

In the embodiments shown in FIGS. 1 and 2 the c c d camera may have 256 different output values for the total reach of the balances. This reach between the highest and the lowest weight value is about 40 gram for eggs, which means an accuracy of about 0.15 g. Because the balances are well damped and have a rather long time period (at least several seconds) to damp out the invention provides a weight measuring system for eggs for instance having a weighing fault, that is only a fraction of that of available machines. If desired c c d cameras having a far higher resolution than 256 positions can be used, because also such cameras are commercially available.

Other means for detecting the balance position can consist in a row of Reed switches activated by the part 17, which then has to be a permanent magnet. Other elements, which can be magnetically activated are so called Hall generators and elements based on the Wiegand effect using a wire with a different coercive force in its centre and its outer region, a pulse being generated in a coil surrounding said wire if a magnetic field passes. Hall generators are based on a variation in resistance value caused by a magnetic field.

Figure 3:
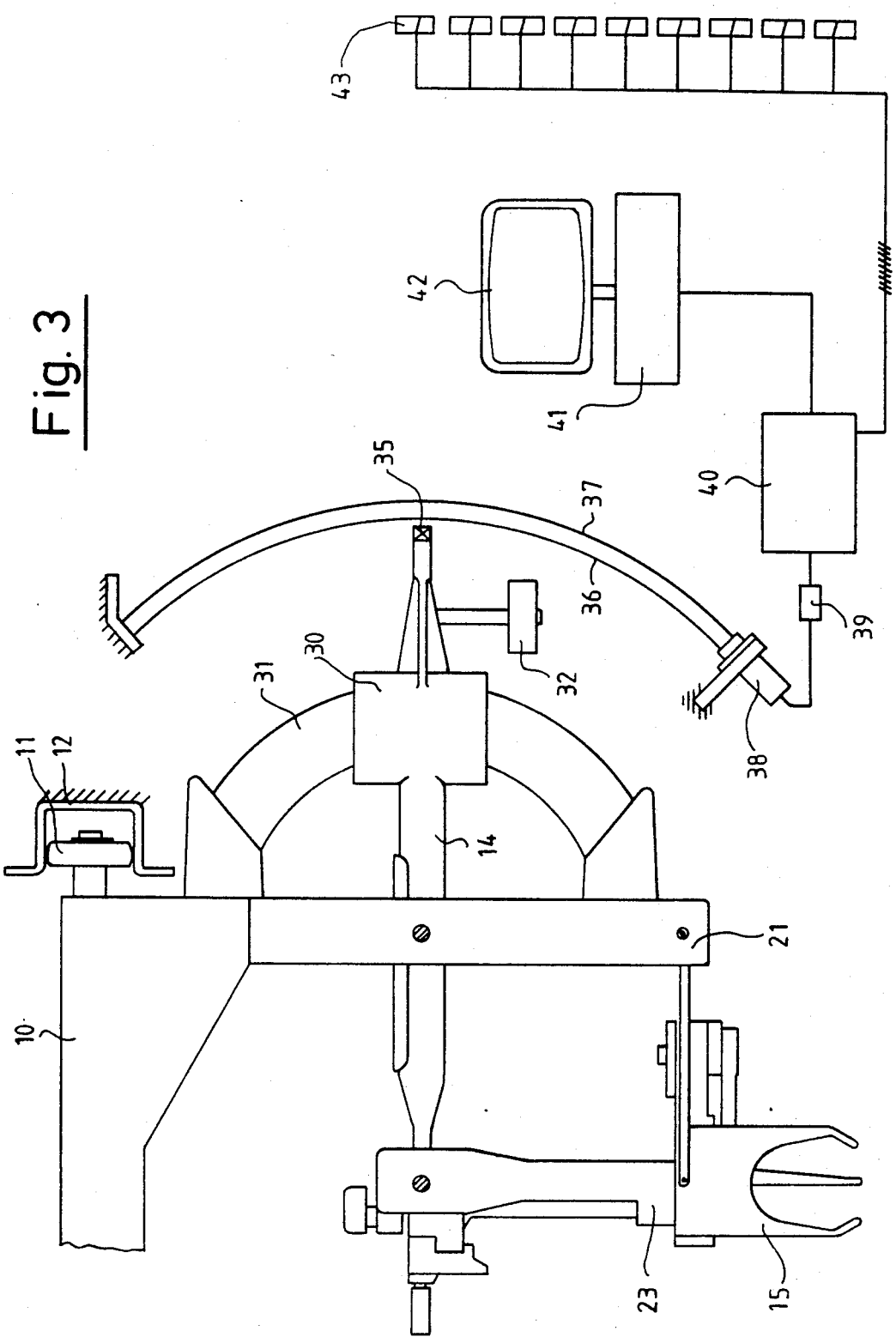
FIG. 3 shows part of the bridge according to FIG. 2, in which the magnetostrictive embodiment of the invention is shown.
Figure 4:
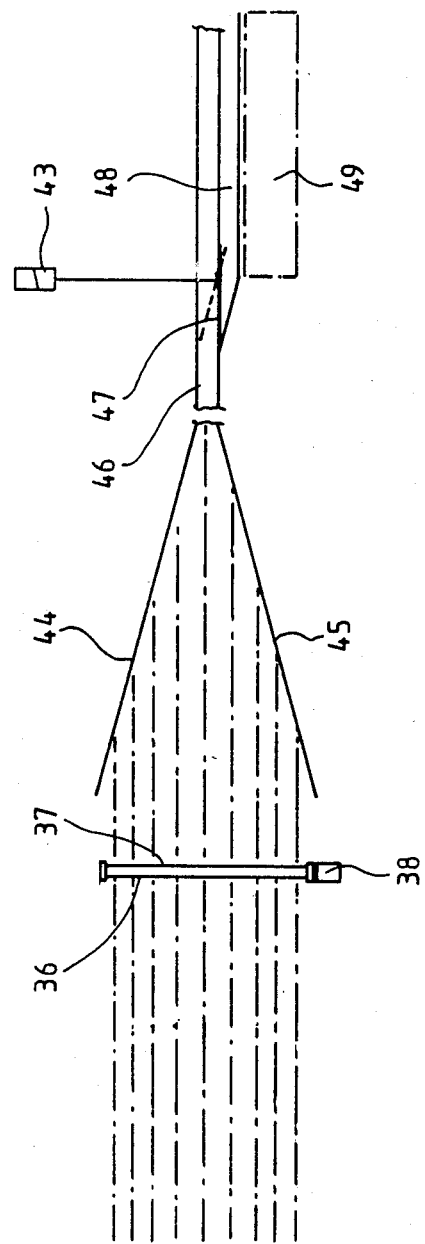
FIG. 4 shows schematically the control means for output stations in an embodiment of the invention.

In FIG. 3 and 4 a further embodiment of the invention has been shown.

In FIG. 3 those parts which are also present in FIG. 2 are indicated with the same references. Part 17 has been replaced by a permanent magnet 35, which generates a magnetic field, that is vertically oriented in FIG. 3. A magnetostrictive distance measuring device of in principle known construction and already a considerable time commercially available detects the position of magnet 35. A description of such a magnetostrictive measuring system can be found in "Elektronik Praxis" Vogel Verlag Wür zburg, 16, nr. 3, March 1981. Though per se no part of the invention it is remarked that this measuring device has an oblong member which electrically conducts 36 and an oblong member of ferromagnetic material with magnetostrictive properties, that forms a wave guide for mechanical waves.

A unit 38 is electrically connected to the electrical conductor 36 and mechanically to the mechanical wave guide 37 by means of a feeler. When a current pulse is sent through the conductor 36, which purely schematically has been indicated in the drawing, this pulse will generate a magnetic field encircling the conductor 36. This field will interact with the magnetic field issued from magnet 35. This interaction creates a deformation in the magnetostrictive material, which deformation propagates itself as a mechanical pulse along the oblong member 37. The unit 38 filters out the pulse and the time lapse between the occurrence of the current pulse and the arrival of the mechanical pulse is a measure for the distance along 37 from the location of magnet 35 to the unit 38. Variations of the position of the balance arm 14 in this way are accurately measured, the measured quantity being a time period. With electronic means known per se, for instance a counter started with the occurrence of the current pulse and counting the number of pulses from a frequency stabilized generator until it is stopped by the arrival of the mechanical pulse, a digitalized quantity is obtained which is a measure for the position of the balance and consequently the weight of the object in the balance.

This digitalized value is fed to a processor 40. This processor allots a weight class to this value, according to values inserted by means of a key-board 41 and visualized in a display 42. The way in which weight classes are set by means of key-board 41 is no part of this invention. Also it is possible to visualize other data on display 42 such as quantities or weights of objects in certain classes.

This processor 40 further is connected to a number of output station controlling means 43, such that at the moment a balance arrives at a control means 43 and the processor 40 indicates that the balance in question has to discharge at that output station, the related control means 43 is activated.

In FIG. 4 dash-dot lines indicate the height positions of the follow rollers 16 for balances containing objects of different weights. At the magnetostrictive measuring device 36, 37, 38 the weight value is ascertained and the follow rollers 16 are caught by converging guides 44 and 45, which debouch into a guide 46 which is provided with a number of switch members 47 controlled by control members 43. When a control member 43 is activated the related switch member 47 takes the position indicated with an interrupted line and conducts the follow roller 16 into guide 48 which cooperates with the discharge control 49 of an output station.

The embodiment of FIGS. 3 and 4 has apart from the use of magnetostrictive measuring apparatus, which for use with the invention may be of any suitable form, the feature that the measured values are directly used for controlling output stations. Any other system in which the measured value is used for controlling output stations, is, however, covered by this invention.

Though the combination of a bent magneto-strictive member with a moving balance is part of this invention it is remarked that it is also possible to use a straight magnetostrictive member provided the balance is constructed such, that a part of it moves along an almost straight track with different weight loads, as is known per se.

Finally it is remarked that the upper side of the members 36 and 37 is supported by a suitable mounting for damping out mechanical waves. These members have been indicated in a purely schematic form which is no indication of their cross-section and/or mutual position.

What I claim is:

1. Weighing device comprising a plurality of moving balances which travel one after the other along a fixed path of travel and each of which includes a movable member adapted to take a position that is dependent on the load weight on the balance, said device including a first region in which objects to be weighed are fed to the balances and a second region in which the movable members of said balances come to rest in their final load weighing position, and a detector means disposed at a fixed location along said path of travel for indicating the final load weighing position of the balances in digital form, said balances each including a magnetic part which is movable with the movable member of the associated balance, and said detector means comprising a magnetostrictive distance measuring system comprising electrical current pulse source, an electrical conductor, to which electrical pulses from said source are applied, a magnetostrictive member for generating a mechanical pulse at a location corresponding to the final load weighing location of the movable magnetic part of the balance, and receiver means for receiving a said mechanical pulse and for producing a signal indicating the final load weighing position of said balance dependent upon the time required for the mechanical pulse to travel from the location at which the mechanical pulse was generated to said receiver means.

2. Weighing device according to claim 1, in which the said electrical conductor is formed in the shape of an arc of a circle corresponding to the arc shaped path of movement of the magnetic part of the balance, and said magnetostrictive member is of a shape similar to that of said electrical conductor and is disposed in spaced parallel relationship to said electrical conductor, said current pulse source being located at one end of said electrical conductor, and said receiver means comprising a receiver for mechanical pulses connected at one end of said magnetostrictive member.

3. Weighing device according to claim 1 provided with a plurality of output stations to which are delivered objects having a weight within a predetermined weight class, said device further comprising a positioning device for bringing the balances into a position in which the balances discharge at an output station having the weight class encompassing the weight detected by said detector means, a plurality of guides cooperating with the balances to conduct the balances to the appropriate output station, and electromagnets at the entrance side of the guides for cooperating with the magnetic part of the balances to ensure correspondence between the output station at which the balance is to discharge and the load weight detected by the detector means.

4. Weighing device according to claim 1 provided with a calculator means for deriving from an indication of the balance position, the weight of the load on the balance in digital form.

5. Weighing device according to claim 1 provided with a number of output stations each provided with control means for controlling discharging of the weighed objects, said device further comprising means for deriving from the output of the detector means the weight class of the objects weighed by the balances, means for generating a signal for activating at least one of said control means and a retardation means for retarding said activating signal during a time period equal to the time required for a weighed object to travel from the detector means to the associated output station.

6. Weighing device according to claim 1 further comprising calculator means for alloting the weighed objects to a number of weight classes and for calculating the total weight of the objects in each class.

* * * * *